Dec. 24, 1935.  J. V. CAPUTO  2,025,155
WELDING ELECTRODE
Filed May 17, 1932  2 Sheets-Sheet 1
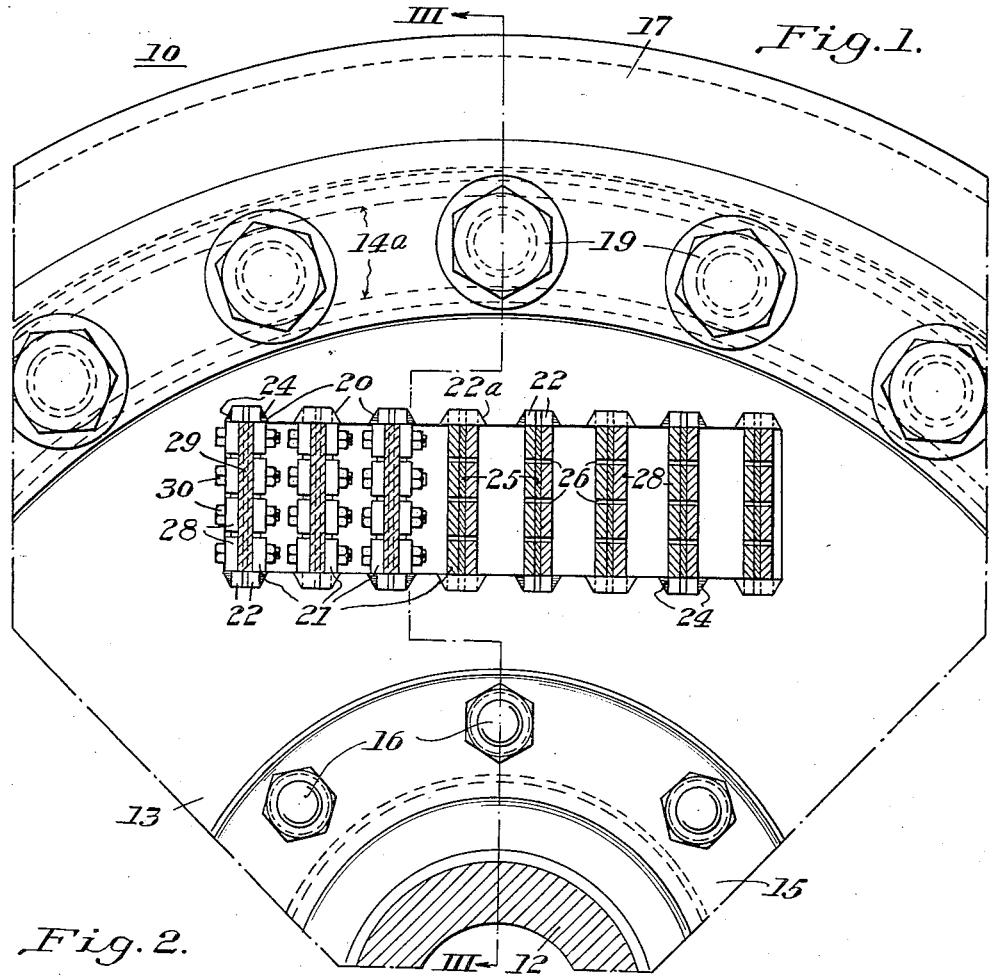
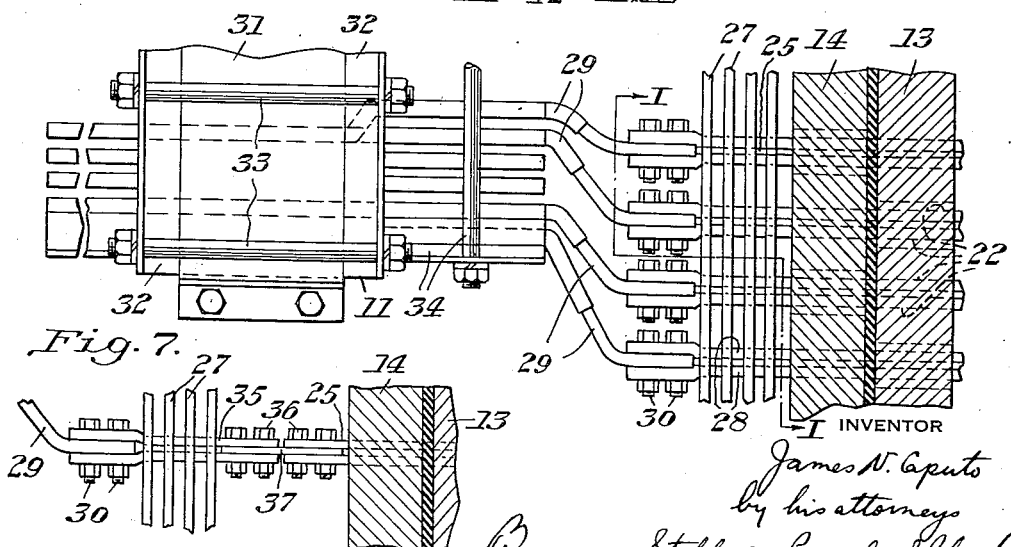

Dec. 24, 1935.   J. V. CAPUTO   2,025,155
WELDING ELECTRODE
Filed May 17, 1932    2 Sheets-Sheet 2
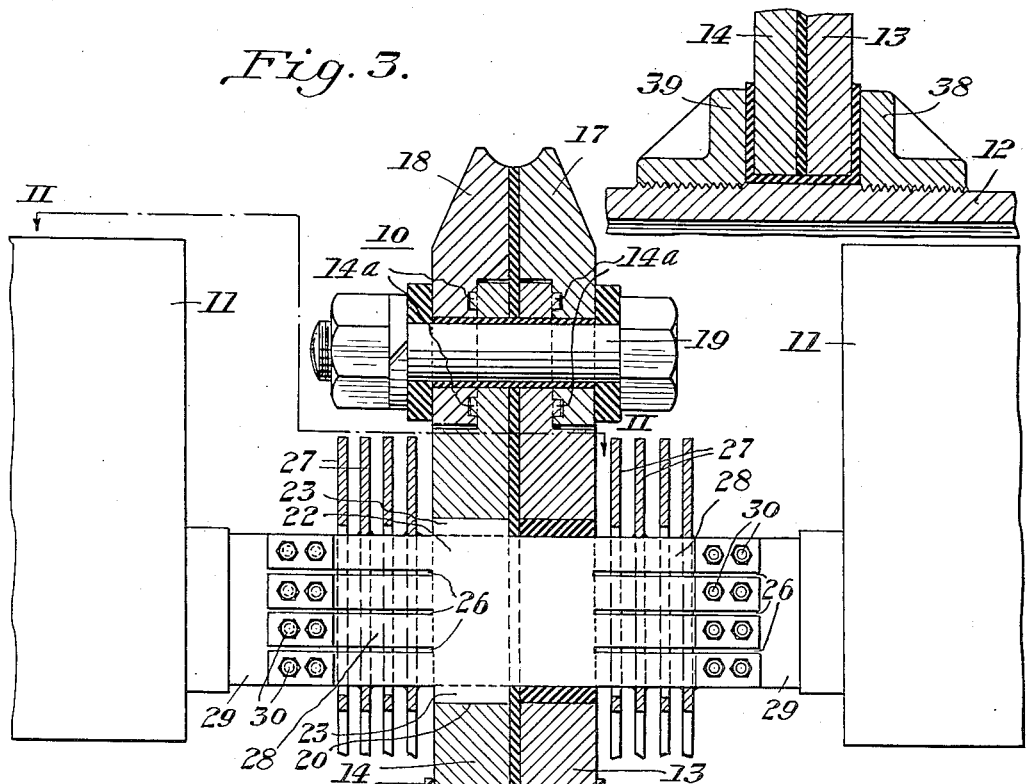
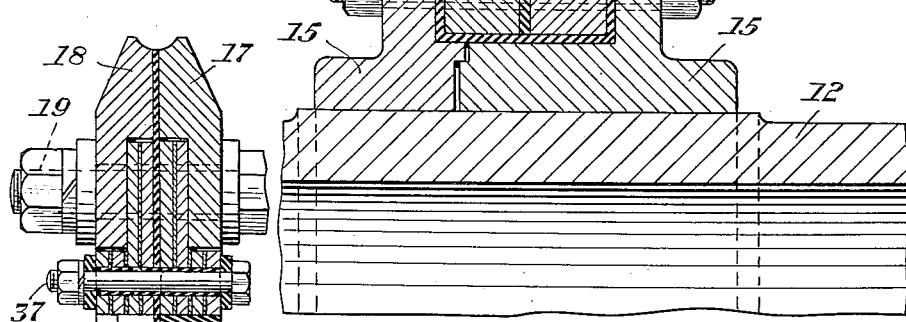
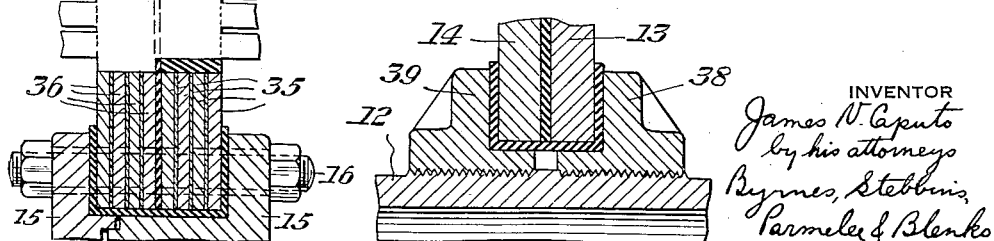
INVENTOR
James V. Caputo
by his attorneys
Byrnes, Stebbins,
Parmelee & Blenko Patented Dec. 24, 1935

2,025,155

UNITED STATES PATENT OFFICE 2,025,155

WELDING ELECTRODE

James V. Caputo, Crafton, Pa.

Application May 17, 1932, Serial No. 611,790

5 Claims. (Cl. 219—4)

My invention relates to the art of electric welding and, in particular, to the welding of pipe or tubular products by the continuous resistance method, making use of a rotating electrode having supply transformers adapted for rotation with the electrode.

Welding apparatus comprising a rotating electrode and supply transformers rotating therewith are well known to the art but have not been applied practically to any considerable extent because of the difficulties involved in handling the large currents required for welding the larger sizes of tubes. The current necessary for welding tubes of certain commercial sizes is of the order of one hundred thousand amperes or greater, and none of the patented apparatus with which I am familiar can be designed to handle currents of this value. For conducting currents of the magnitude mentioned through the welding circuit, large masses of conducting material, such as copper, are evidently necessary. There are certain objections and limits, however, to the indiscriminate use of a large conducting cross section for handling heavy alternating currents. In fact, it is quite possible that under certain conditions, an increase in the cross section of the conductors constituting the welding circuit will have no effect whatever in reducing the losses occasioned by the resistance of the circuit, or the reactance thereof which contributes to lowered efficiency and power factor. It is a well known principle of alternating current theory that the resistance of a circuit to alternating current is greater than the resistance to direct current, and the difference between the so-called alternating current and direct current resistance becomes very considerable when large conductors are necessary because of the heavy currents involved. This difference between the resistances, of course, is occasioned by the skin effect.

I have invented a welding electrode which is capable of handling alternating currents sufficiently large for continuously welding commercial sizes of pipe by the resistance method and avoids the excessive energy losses, voltage drops due to resistance and reactance, resulting in lowered power factor and efficiency, characterizing the welding electrodes known to the prior art. The invention makes use of the certain principles of alternating current theory to reduce the skin effects so that the resistance of the welding circuit including the portions of the electrode and the connections thereto, to alternating current, approaches quite closely the resistance of the circuit to direct current.

One of these principles is that if a current-conducting member, instead of being made in one piece, is divided into a plurality of different portions along the current path, and if the flux is permitted to encircle each portion individually without encircling the other portions, a more uniform distribution of current is obtained which is marked by a reduction in the skin effect and the alternating current resistance. One method of permitting the flux created by current in one portion of a conductor to encircle that portion alone, is to provide a low reluctance magnetic path between said portions, for example, by inserting a small amount of iron between conductor portions. This, of course, increases the reactance of the circuit because the presence of iron adjacent any alternating current circuit has that effect, but a more uniform distribution of the current is obtained since the current tends to distribute itself more symmetrically without the concentrating influence of the flux due to the entire current encircling all portions of the conductor.

It is possible, by means of the present invention, to vary the reactance of the electrode circuit and the resistance thereof to obtain the desired combination of values for these functions. The use of iron in the circuit, as aforementioned, increases the reactance while it reduces the alternating current resistance by decreasing the skin effect. It is thus possible to effect a very satisfactory compromise between reactance and resistance which will give the best results.

In accordance with the invention, I provide a welding electrode comprising a pair of conducting discs encircled by annular rims adapted to engage a formed tube on opposite sides of an axial seam cleft therein. Each disc is in electrical contact with the rim carried thereby but the rims are insulated from each other and the discs likewise. Keying rings ensure proper alignment of each rim on its disc. The electrode is mounted on a shaft for rotation whereby said rims continuously engage the sides of the seam cleft in a pipe moved past the electrode. Supply transformers are also mounted on said shaft in any convenient manner, preferably as close to the electrode as possible. Short, direct connections extend from the transformers on both sides of the electrode to both the discs thereof, in accordance with the construction described and claimed broadly in my co-pending applications, Serial No. 453,185, filed May 17, 1930, for Continuous electric welding machine, and Serial No. 475,174, filed August 14, 1930, for Electric welding machine.

The connections from the transformers on both sides of the electrode to both the discs thereof are constituted by relatively thin, flat conducting plates positioned in groups in holes formed in the electrode discs. The holes may be rectilinear or arcuate. Alternate plates disposed in succession around the electrode engage opposite discs for electric conducting relation therewith, and are insulated from the other disc.

In a modified form of the invention, the electrode discs themselves are of laminated construction similar to those mentioned for the electrode connections. In all forms of the invention, the terminals of said connections extending beyond the electrode discs are provided with slots perpendicular to their sides tangent to the circumscribed circle.

The invention also includes removable groups of interleaved side rings for the electrode which provide low-resistance, bypassing circuits for welding current, in parallel with the main circuit through the electrode discs. By making these side rings removable, they can be salvaged in case the body of the electrode is subjected to injury.

Another important feature of the invention is that it provides a welding electrode which can be assembled from rolled material. This makes it possible to manufacture the electrode more easily and at lower cost than where cast members are used. In addition, the possibility of gas or blow holes in castings is eliminated. Regardless of whether rolled or cast material is used, the construction of the electrode is such that it may be manufactured at relatively low cost compared to prior devices.

For a complete understanding of the invention, reference is made to the accompanying drawings illustrating a present preferred embodiment. In the drawings:

Figure 1 is a partial side elevation of a welding electrode embodying the invention, portions thereof being shown in section;

Figure 2 is a top plan view showing a portion of one of the transformers associated with the electrode and certain of its connections to the electrode. Line I—I of Figure 2 indicates the plane on which the section through certain elements shown in Figure 1 might be taken;

Figure 3 is a sectional view along the line III—III of Figure 1, illustrating the transformers in side elevation. The line II—II of Figure 3 indicates generally the plane on which the sectional portion of Figure 2 is taken;

Figure 4 is a view similar to Figure 3 illustrating a modification;

Figures 5 and 6 show modified forms of supports for the electrode discs; and

Figure 7 is a partial view similar to Figure 2 illustrating the removable side rings for the electrode.

Referring in detail to the drawings, the invention comprises an electrode 10, with transformers 11 symmetrically arranged on a shaft 12 on opposite sides thereof. The transformers may be mounted on the shaft 12 by any suitable means. The electrode 10 comprises a pair of discs 13 and 14 coaxially disposed, insulated from each other and secured together by clamping rings 15 keyed to the shaft 12, and studs 16. Annular rims 17 and 18 are mounted on the discs 13 and 14. Keying rings 14a ensure proper alignment of the rims 17 and 18 with the discs 13 and 14, respectively. The rims are insulated from each other but each have electrically conducting contact with one of the discs 13, 14. Bolts 19 extending through the rims and the periphery of the discs are insulated from both rims and discs and secure the latter firmly together.

The discs 13 and 14 are provided with a plurality of rectangular holes 20 arranged to receive conducting connections in groups 21 about the discs. The holes 20 in the discs 13 and 14 are in alignment.

Conducting connections extend through said holes 20 and outwardly thereof on both sides of the electrode. Each of these connections comprises a pair of relatively thin, flat plates 22. Each plate has enlarged shoulders 23 thereon adapted to fit tightly in slots 24 in the holes 20. The plates are brazed or welded to the discs at all points of contact. Each of the plates 22 is thus placed in current conducting relation with one of the discs 13, 14. The portion of each plate extending through the other disc is insulated therefrom as at 22a. Successive connections seated in the holes 20 of each group 21 engage alternate discs 13 and 14 and each connection comprises preferably a pair of the plates 22. A thin piece of magnetic material 25 is placed between the plates 22. The projecting ends of the plates 22 are slotted at 26 perpendicular to their lateral faces.

Auxiliary current conducting discs 27 are seated on the projecting portions of the plates 22, as described and claimed in my co-pending application, Serial No. 549,441, filed July 8, 1931, for Electrodes. Successive discs 27 along the axis of the electrode engage the projections of the plates 22 extending through alternate holes 20.

The transformers 11 are positioned in pairs on opposite sides of the electrode, one pair for the connections extending through each group 21 of the holes 20. The ends of the projecting portions of the electrode connections, indicated at 28, are slightly spread adjacent their ends to receive therebetween a transformer terminal 29. Bolts 30 effect a good connection between these parts. The terminals 29 are alternately of opposite polarity and supply current to opposite electrode discs. The transformer core is indicated at 31 and is contained within the frame constituted by structural members 32 secured together by bolts 33. Bracing for the coil ends is indicated at 34.

It is to be understood that Figure 2 shows only one-half of the transformer and the electrode connections associated therewith but the other half is identical.

It will be apparent from the foregoing description that the invention provides a conducting path for welding current having corresponding portions thereof interleaved whereby opposite instantaneous polarity of the current in such portions reduces the reactance of the circuit to a minimum. The power factor and efficiency are therefore superior to those obtained with present types of electrodes. A still greater advantage, however, is the fact that the shape of the conductors carrying the welding current, in cross section, is such that the skin effect is minimized. The ratio of the alternating current resistance to direct current resistance approaches unity quite closely. By using two conducting plates for each electrode connection, a greater conductor surface is made available and this is what contributes to the low ratio between alternating current and direct current resistances. The use of an iron sheet or strip between the two separate plates forming each connection provides a low reluctance path for the lines of flux threading between the two conducting plates and has the same effect on the skin effect as would be produced by spacing the two conductors at a considerable distance apart. In accordance with the principles previously set forth, this arrangement minimizes the skin effect since the connecting plates carry current in the same direction. The reactance is slightly increased but not sufficiently to be objectionable. The slotting of the connecting plates in a plane perpendicular to their lateral faces further increases the surface of the plates so that the skin effect is further reduced so as not materially to increase the alternating current resistance over the direct current value.

The arrangement of the electrode connections shown permits the transformers 11 to be removed from the shaft 12 radially after the connections have been unbolted. It is thus possible to obtain ready access to any transformer for repair or replacement.

A modified form of the invention is illustrated in Figure 4. According to the modified form of the invention, the electrode discs 13 and 14 are replaced by the groups of laminations 35 and 36. A thin sheet of iron may be disposed between each of said discs in the manner explained above in connection with the electrode connections. The electrode construction of Figure 4 includes bolts 37 for securing the outer laminations together, but otherwise is the same as that previously described. The lamination of the main electrode discs themselves, further reduces the skin effect. As before, the reactance is slightly increased but this merely forces a greater portion of the current into the side rings.

Since all the members of the electrode shown in Figure 4 are of fairly small thickness, it is possible to utilize rolled material for the manufacture thereof. This is also possible with the form of electrode shown in Figures 1 through 3 even though greater thicknesses of material are involved. Even the rims 17 and 18 may be rolled. Preferably, they are rolled straight to the cross section shown in Figure 3 and are then heated and bent to the required circular shape.

Figures 5 and 6 illustrate alternative means for mounting the electrode discs 13, 14 on the shaft 12, comprising rings 38 and 39 threaded on the shaft.

Figure 7 illustrates a modification of the invention according to which the side rings 27 are mounted on conducting straps 35 which are secured to the connections 25 by bolts 36 and a connecting link 37. By providing a releasable connection between the side rings and the electrode discs, the rings can be salvaged even in case the electrode is injured for any reason, so as to be no longer usable.

Although I have illustrated and described herein but one present preferred embodiment of the invention, together with a partial modification thereof, the invention is not limited to the embodiments described and illustrated herein since the latter may be varied considerably without departing from the spirit of the invention or the scope of the appended claims.

I claim:

1. In an electrode construction, a pair of conducting discs disposed in side-by-side relation, a plurality of connections extending through said electrode, each connection comprising a plurality of flat plates, all the plates of each connection having current conducting engagement with at least one of said discs, and a layer of magnetic material between the plates constituting each connection.

2. An electrode construction comprising a pair of discs each comprising a plurality of conducting plates separated at least by surface layers of oxide thereon, conducting rims carried on said discs, and connections extending through said discs.

3. A welding electrode including a conducting disc, said disc being laminated axially thereof, the laminations being separated by at least surface layers of oxide.

4. In a welding electrode, a pair of juxtaposed conducting discs, lateral extensions therefrom by-passing side rings for the electrode mounted on said extensions, and magnetic material disposed radially of said discs for forcing current into said bypassing rings.

5. A welding electrode comprising a pair of discs, a plurality of by-passing rings on opposite sides of the electrode, and current-supply connections extending through said rings into contact with said discs, each of said connections including a releasable joint between the rings and the disc.

JAMES V. CAPUTO.